No. 773,313. PATENTED OCT. 25, 1904.
H. DAVID.
NON-SLIPPING DEVICE FOR TIRES.
APPLICATION FILED JUNE 18, 1904.
NO MODEL.

*Fig. 2.*     *Fig. 3.*

*Fig. 4.*     *Fig. 5.*

Witnesses
Thomas Ober
Waldo M. Chapin

Inventor
Henri David
by
Rosenbaum & Stockbridge
attys.

No. 773,313. Patented October 25, 1904.

UNITED STATES PATENT OFFICE.

HENRI DAVID, OF PARIS, FRANCE.

NON-SLIPPING DEVICE FOR TIRES.

SPECIFICATION forming part of Letters Patent No. 773,313, dated October 25, 1904.

Application filed June 18, 1904. Serial No. 213,079. (No model.)

*To all whom it may concern:*

Be it known that I, HENRI DAVID, engineer, a citizen of the French Republic, residing at Paris, in the Department of the Seine and Republic of France, have invented new and useful Improvements in Non-Slipping and the Like Devices for Pneumatic and other Tires, of which the following is a specification.

These improvements relate to a non-slipping or antiskidding device for use upon a wheel-tire and which will also act as a puncture-preventer for use upon a pneumatic tire, such device being of that type which consists of a number of flexible or flexibly-connected metallic or other plates disposed upon or around the tread of the tire.

According to this invention the different links or plates which form a chain or armor around the tire are flexibly connected together in a certain manner and by certain means, so that each is free to move independently, but so that they cannot become accidentally disconnected. One link in the chain or one connecting device is adjustable or variable as desired.

Figure 1:
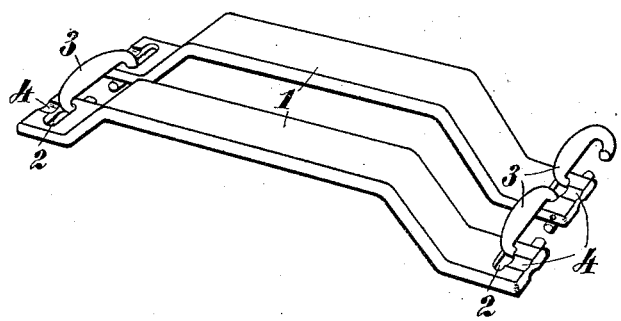
Figure 1:
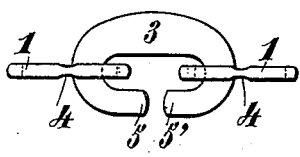
Figure 1:
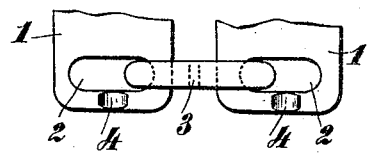
Figure 1:
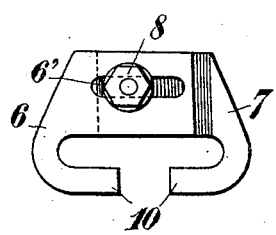
Figure 1:
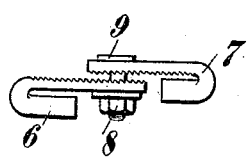

In the accompanying drawings, Figure 1 shows in perspective view two of the plates or links 1, any number of which may be combined to form a chain to extend around the whole of the tread of the tire, the plates being transversely disposed across the tire in the manner of the plates illustrated and described in the specification to my previous application for patent in the United States of America, Serial No. 189,856, filed January 20, 1904. Fig. 2 is an end view of the same two links or plates with their connecting-links. Fig. 3 shows one end of them in plan. Figs. 4 and 5 are a side elevation and a plan, respectively, of a link or connecting device which is adjustable and which is employed to fasten the last two links together of a chain.

The ends of the plates 1 are slotted, as shown at 2, to any desired size and to receive the ends of open links 3, which are adapted to connect contiguous links or plates together, as illustrated. The center part of each end of a plate is recessed or thinned, as at 4, and leading to the slot 2, and the distance between the ends 5 and 5' of a link 3 is such that the link can only be introduced into the end of a plate by passing the ends of the link over the thinned portion of the plate end—that is, the distance between 5 and 5' is only sufficiently greater than the thickness of this part 4 to permit the passage of the ends of the link. Thus when a link 3 is in place in a plate it can only be removed by properly passing its ends 5 and 5' over the thin part 4 of the plate and there is no fear of a link becoming accidentally displaced. Each link 3 is preferably strengthened or thickened opposite to its open part. All the plates 1 1 extending around a tire are thus firmly joined to each other around a tire by the links 3; but they do not present a rigid surface or line, and each plate is capable of independent movement.

The two end plates of the chain may be joined together to complete the ring around the tire by the extensible link shown in Figs. 4 and 5. This link is formed of two parts 6 and 7, placed against one another and the contiguous surfaces of which are toothed or serrated. The part 7 is provided with a screw 9 which also passes through a slot 6' on the part 6, and is provided with a nut 8. By loosening the screw-nut and owing to the slot 6' the two parts may be moved upon one another, so that the distance between the jaws or link ends 10 may be varied. These jaws are adapted to engage with slots in the plates in the same way as the jaws 5 5'. When the jaws 10 are engaged with their plates, the screw-nut 8 is tightened up and the two parts 6 and 7 are locked together. When this variable link is in place, the distance between its jaws 10 should be less than the thickness of one of the plates 1. Such an adjustable jaw is only given as an example, and other equivalent devices may be employed to complete the chain of plates.

Having now particularly described and ascertained the nature of my said invention and in what manner the same is to be performed, I declare that what I claim is—

1. An anti skidding or slipping device for pneumatic and other tires, consisting of a chain or ring of transverse plates disposed around the tire, each plate being slotted at its ends and formed with a thin or recessed part leading to such slots and contiguous plates being connected together by open links adapted to engage with the slots in the plate ends, substantially as and in the manner hereinbefore described.

2. In an anti skidding or slipping device for use upon a pneumatic or other tire and consisting of a chain of plates arranged as described herein, the combination with the end plates of such a chain of an adjustable link, constructed and arranged substantially as hereinbefore described.

In testimony whereof I have signed my name to this specification in the presence of two subscribing witnesses.

HENRI DAVID.

Witnesses:
HENRY DANZER,
LUCIUS CRESPIN.